(12) United States Patent
Lee et al.

(10) Patent No.: US 10,694,602 B2
(45) Date of Patent: Jun. 23, 2020

(54) RIPPLE SUPPRESSOR

(71) Applicant: Leadtrend Technology Corp., Hsinchu County (TW)

(72) Inventors: Hung-Ching Lee, Hsinchu County (TW); Ruei-Jhih Jheng, Hsinchu County (TW); Chun-Hsin Li, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 16/527,034

(22) Filed: Jul. 31, 2019

(65) Prior Publication Data
US 2020/0154536 A1    May 14, 2020

(30) Foreign Application Priority Data

Nov. 8, 2018    (TW) .............................. 107139585 A

(51) Int. Cl.
| | | |
|---|---|---|
| *H05B 45/37* | (2020.01) | |
| *G05F 1/46* | (2006.01) | |
| *H05B 45/00* | (2020.01) | |
| *H05B 45/48* | (2020.01) | |

(52) U.S. Cl.
CPC .............. *H05B 45/37* (2020.01); *G05F 1/46* (2013.01); *H05B 45/00* (2020.01); *H05B 45/48* (2020.01)

(58) Field of Classification Search
None
See application file for complete search history.

(56) References Cited

U.S. PATENT DOCUMENTS 8,981,667 B2    3/2015    Shao

FOREIGN PATENT DOCUMENTS

| CN | 102958236 B | 3/2015 |
|---|---|---|
| TW | I445450 B | 7/2014 |
| TW | I600346 B | 9/2017 |

*Primary Examiner* — Monica C King
(74) *Attorney, Agent, or Firm* — Winston Hsu

(57) ABSTRACT

A ripple suppressor includes a constant current generation circuit and a voltage regulation circuit. The constant current generation circuit is coupled to a light-emitting diode chain, wherein the constant current generation circuit is used for generating a detection voltage, and generating a constant current to the light-emitting diode chain. The voltage regulation circuit is coupled to the light-emitting diode chain and the voltage regulation circuit, wherein the voltage regulation circuit makes the constant current generation circuit generate the constant current according to the detection voltage and a compensation value, or makes the constant current generation circuit generate the constant current according to the detection voltage, wherein the compensation value is changed with an average voltage generated by the voltage regulation circuit, and the average voltage corresponds to a voltage of an end of the light-emitting diode chain.

11 Claims, 3 Drawing Sheets

RIPPLE SUPPRESSOR

BACKGROUND OF THE INVENTION

1. Field of the Invention

The present invention relates to a ripple suppressor, and particularly to a ripple suppressor that can save power loss during a high dimming duty cycle of a power factor correction voltage converter driving a light-emitting diode chain, and prevent the light-emitting diode chain from generating flickers during a low dimming duty cycle of the power factor correction voltage converter.

2. Description of the Prior Art

Because of high emission efficiency and low power loss, light emitting diodes (LEDs) have been widely used as light sources. In the prior art, a driving circuit driving a light emitting diode only utilizes a single stage power factor correction (PFC) voltage converter to drive the light emitting diode. However, a characteristic of the power factor correction voltage converter is that a driving voltage for driving the light emitting diode generated by the power factor correction voltage converter simultaneously has large ripples. The ripples may make a power transistor coupled to the light emitting diode operate in a triode region during a low dimming duty cycle of the power factor correction voltage converter, so meanwhile the power transistor cannot provide a stable driving current to the light emitting diode, resulting in the light emitting diode having flickers. Therefore, how to design a ripple suppressor becomes an important issue.

SUMMARY OF THE INVENTION

An embodiment of the present invention provides a ripple suppressor. The ripple suppressor includes a constant current generation circuit and a voltage regulation circuit. The constant current generation circuit is coupled to a light-emitting diode chain, wherein the constant current generation circuit is used for generating a detection voltage, and generating a constant current to the light-emitting diode chain. The voltage regulation circuit is coupled to the light-emitting diode chain and the constant current generation circuit, wherein the voltage regulation circuit is used for making the constant current generation circuit generate the constant current according to the detection voltage and a compensation value, or making the constant current generation circuit generate the constant current according to the detection voltage, wherein the compensation value is changed with an average voltage generated by the voltage regulation circuit, and the average voltage corresponds to a voltage of an end of the light-emitting diode chain.

The present invention provides a ripple suppressor. The ripple suppressor can utilize a voltage regulation circuit to determine whether to generate a compensation value according to an average voltage corresponding to a voltage of an end of a light-emitting diode chain coupled to the ripple suppressor, and utilize the voltage regulation circuit to make a constant current generation circuit generate a constant current according to a detection voltage generated by the constant current generation circuit and the compensation value, or make the constant current generation circuit generate the constant current according to the detection voltage. Therefore, compared to the prior art, because the voltage regulation circuit does not generate the compensation value during a high dimming duty cycle of a power factor correction voltage converter driving the light-emitting diode chain, and the voltage regulation circuit generates the compensation value during a low dimming duty cycle of the power factor correction voltage converter, the ripple suppressor not only can save power loss during the high dimming duty cycle of the power factor correction voltage converter, but can also prevent the light-emitting diode chain from generating flickers during the low dimming duty cycle of the power factor correction voltage converter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
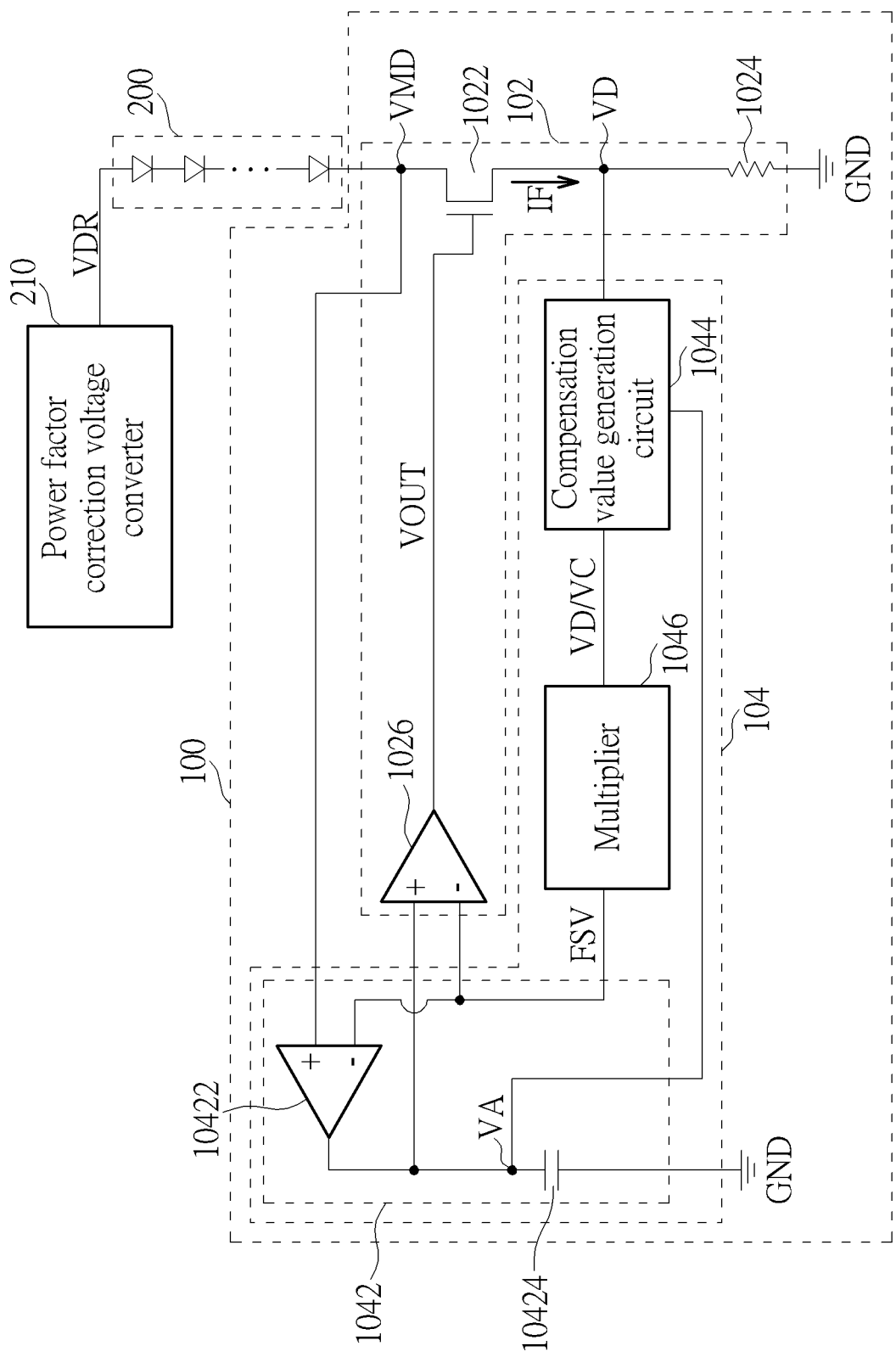
FIG. 1 is a diagram illustrating a ripple suppressor according to a first embodiment of the present invention.

Please refer to FIG. 1. FIG. 1 is a diagram illustrating a ripple suppressor 100 according to a first embodiment of the present invention, wherein the ripple suppressor 100 includes a constant current generation circuit 102 and a voltage regulation circuit 104, the constant current generation circuit 102 is coupled to a light-emitting diode chain 200, the voltage regulation circuit 104 is coupled to the light-emitting diode chain 200 and the constant current generation circuit 102, and the light-emitting diode chain 200 includes at least one light-emitting diode. As shown in FIG. 1, the constant current generation circuit 102 includes a power transistor 1022, a current detection resistor 1024, and an operational amplifier 1026. As shown in FIG. 1, the power transistor 1022 has a drain, a source, and a gate, wherein the drain of the power transistor 1022 is coupled to the light-emitting diode chain 200; and the current detection resistor 1024 is coupled between the source of the power transistor 1022 and ground GND, wherein when the power transistor 1022 operates in a saturation region, the power transistor 1022 can generate a constant current IF to the light-emitting diode chain 200, the constant current IF and the current detection resistor 1024 are used for determining a detection voltage VD. As shown in FIG. 1, an output terminal of the operational amplifier 1026 is coupled to the gate of the power transistor 1022, and an output voltage VOUT of the output terminal of the operational amplifier 1026 is used for making a gate-source voltage of the power transistor 1022 be greater than a threshold voltage VTN of the power transistor 1022.

As shown in FIG. 1, the voltage regulation circuit 104 includes a low-pass filter 1042, a compensation value generation circuit 1044, and a multiplier 1046, wherein the low-pass filter 1042 includes a gain amplifier 10422 and a capacitor 10424, the low-pass filter 1042 is coupled to the light-emitting diode chain 200, the compensation value generation circuit 1044 is coupled to the constant current generation circuit 102 and the low-pass filter 1042, and the multiplier 1046 is coupled to the compensation value generation circuit 1044, the constant current generation circuit 102, and the low-pass filter 1042. As shown in FIG. 1, the gain amplifier 10422 has a positive input terminal, a negative input terminal, and an output terminal, wherein the positive input terminal of the gain amplifier 10422 is coupled to the light-emitting diode chain 200, the negative input terminal of the gain amplifier 10422 is coupled to the negative input terminal of the operational amplifier 1026 and the multiplier 1046, and the output terminal of the gain amplifier 10422 is coupled to the positive input terminal of the operational amplifier 1026; the capacitor 10424 has a first terminal and a second terminal, wherein the first terminal of the capacitor 10424 is coupled to the output terminal of the gain amplifier 10422, and the second terminal of the capacitor 10424 is coupled to the ground GND.

Figure 2:
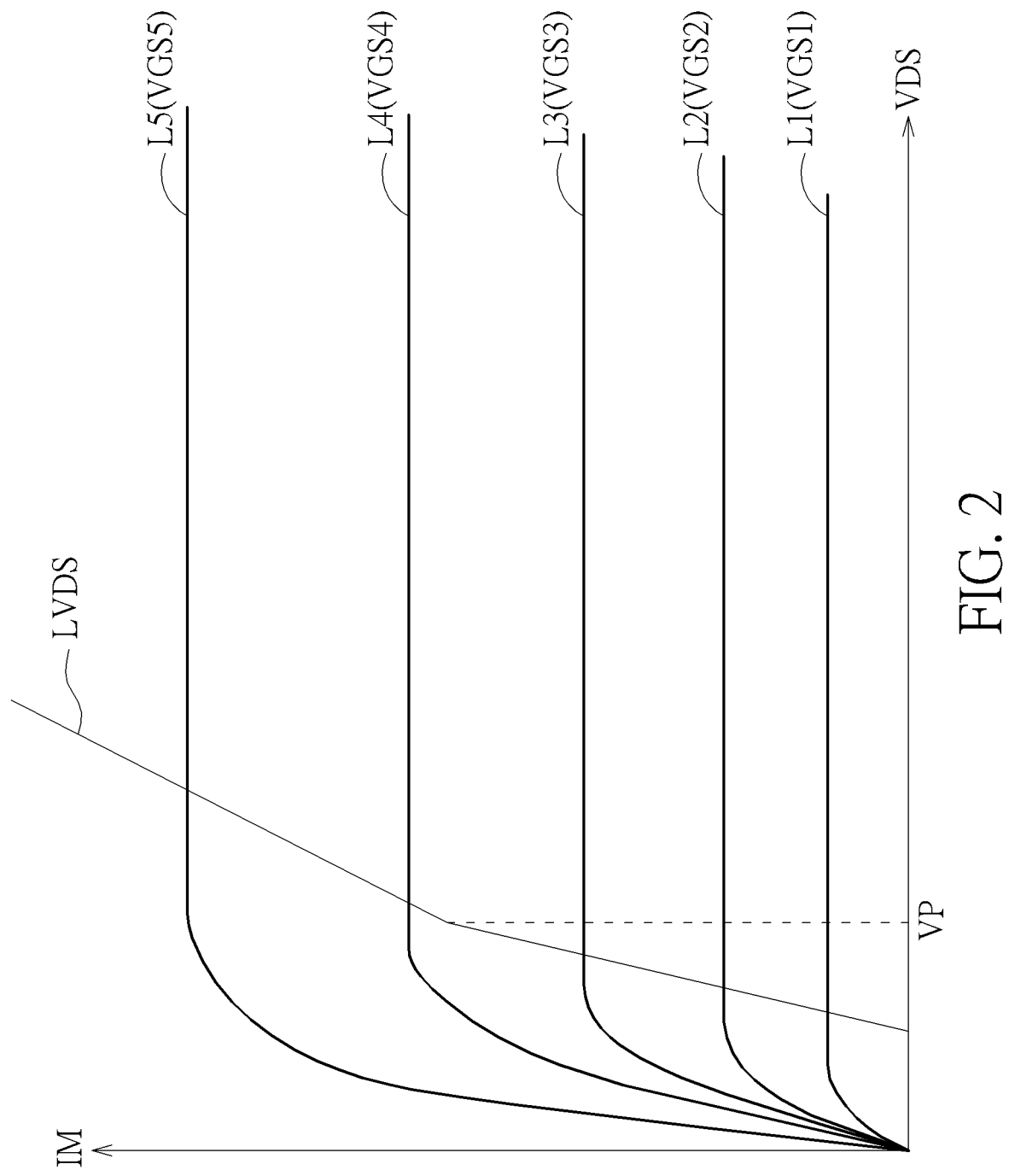
FIG. 2 is a diagram illustrating a relationship between the drain-source voltage of the power transistor and the constant current.

As shown in FIG. 1, the light-emitting diode chain 200 is driven by a driving voltage VDR generated by a power factor correction voltage converter 210, but the driving voltage VDR has large ripples because a characteristic of the power factor correction voltage converter 210, resulting in a voltage VMD (a voltage of the drain of the power transistor 1022) of an end of the light-emitting diode chain 200 also having large ripples. However, because the low-pass filter 1042 is coupled to the light-emitting diode chain 200, the low-pass filter 1042 can filter the ripples of the voltage VMD, and generate an average voltage VA according to the voltage VMD, wherein the average voltage VA corresponds to the voltage VMD. As shown in FIG. 1, the compensation value generation circuit 1044 can determine whether to generate a compensation value according to the average voltage VA. That is to say, when the average voltage VA is greater than a predetermined value (corresponding to a high dimming duty cycle of the power factor correction voltage converter 210), the compensation value generation circuit 1044 does not generate the compensation value. That is to say, as shown in FIG. 2, when a drain-source voltage VDS of the power transistor 1022 is greater than a corresponding value VP, the compensation value generation circuit 1044 does not generate the compensation value, wherein a vertical axis shown in FIG. 2 represents a current IM flowing through the power transistor 1022, a horizontal axis shown in FIG. 2 represents voltage, a line LVDS represents the drain-source voltage VDS of the power transistor 1022, and lines L1-L5 correspond to gate-source voltages VGS1-VGS5 of the power transistor 1022 respectively, wherein the gate-source voltage VGS5 is greater than the gate-source voltage VGS4, the gate-source voltage VGS4 is greater than the gate-source voltage VGS3, the gate-source voltage VGS3 is greater than the gate-source voltage VGS2, the gate-source voltage VGS2 is greater than the gate-source voltage VGS1, the gate-source voltage VGS1 is greater than the threshold voltage VTN of the power transistor 1022, and the corresponding value VP relates to the power transistor 1022. In addition, at a right side of the line LVDS, the lines L1-L5 correspond to different constant currents, respectively.

In addition, because the average voltage VA relates to the voltage VMD (the voltage of the drain of the power transistor 1022), the corresponding value VP of the drain-source voltage VDS of the power transistor 1022 can be referred to FIG. 2 when the average voltage VA is greater than the predetermined value. Therefore, as shown in FIG. 1, when the compensation value generation circuit 1044 does not generate the compensation value, the compensation value generation circuit 1044 can let the detection voltage VD pass. Meanwhile, the multiplier 1046 can generate a first setting voltage FSV according to the detection voltage VD, wherein the first setting voltage FSV is greater than the detection voltage VD. In addition, when the average voltage VA is less than the predetermined value (corresponding to a low dimming duty cycle of the power factor correction voltage converter 210), the compensation value generation circuit 1044 can generate the compensation value. That is to say, as shown in FIG. 2, when the drain-source voltage VDS of the power transistor 1022 is less than the corresponding value VP, the compensation value generation circuit 1044 can generate the compensation value. Therefore, as shown in FIG. 1, when the compensation value generation circuit 1044 generates the compensation value, the compensation value generation circuit 1044 can generate a compensation voltage VC according to the detection voltage VD and the compensation value. Meanwhile, the multiplier 1046 generates the first setting voltage FSV according to the compensation voltage VC, wherein the first setting voltage FSV is greater than the compensation voltage VC.

As shown in FIG. 1, after the first setting voltage FSV is generated, the operational amplifier 1026 coupled to the multiplier 1046 can make the average voltage VA be equal to the first setting voltage FSV, resulting in the voltage VMD being increased (that is, the drain-source voltage VDS of the power transistor 1022 is increased). Therefore, as shown in FIG. 2, because the drain-source voltage VDS of the power transistor 1022 is increased, the drain-source voltage VDS of the power transistor 1022 is greater than a difference between the gate-source voltage of the power transistor 1022 and the threshold voltage of the power transistor 1022. That is to say, the drain-source voltage VDS of the power transistor 1022 needs to be greater than the difference between the gate-source voltage and the threshold voltage and the gate-source voltage needs to be greater than the threshold voltage to ensure that the power transistor 1022 operates in the saturation region, wherein when the power transistor 1022 operates in the saturation region, the power transistor 1022 can generate the constant current IF to prevent the light-emitting diode chain 200 from generating flickers.

Figure 3:
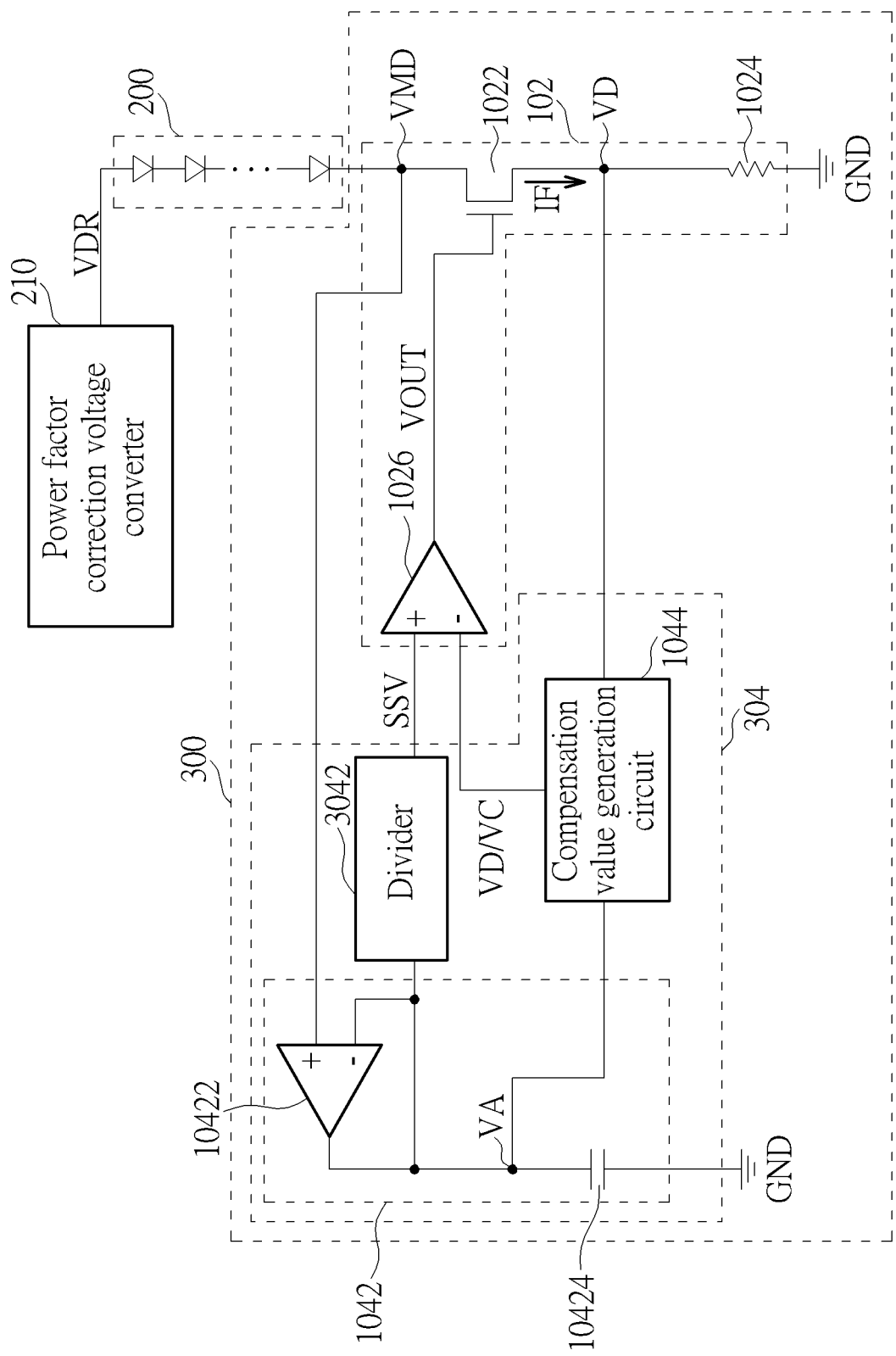
FIG. 3 is a diagram illustrating a ripple suppressor according to a second embodiment of the present invention.

Please refer to FIG. 3. FIG. 3 is a diagram illustrating a ripple suppressor 300 according to a second embodiment of the present invention, wherein the ripple suppressor 300 includes the constant current generation circuit 102 and a voltage regulation circuit 304. As shown in FIG. 3, differences between the ripple suppressor 300 and the ripple suppressor 100 are that the voltage regulation circuit 304 includes a divider 3042 (rather than including the multiplier 1046), the compensation value generation circuit 1044 is coupled to the constant current generation circuit 102 and the low-pass filter 1042, and the divider 3042 is coupled to the negative input terminal and the output terminal of the gain amplifier 10422 and the positive input terminal of the operational amplifier 1026. As shown in FIG. 3, the divider 3042 is used for generating a second setting voltage SSV according to the average voltage VA. In addition, as shown in FIG. 3, the compensation value generation circuit 1044 can determine whether to generate the compensation value according to the average voltage VA. That is to say, when the average voltage VA is greater than the predetermined value, the compensation value generation circuit 1044 does not generate the compensation value. Therefore, as shown in FIG. 3, when the compensation value generation circuit 1044 does not generate the compensation value, the compensation value generation circuit 1044 can let the detection voltage VD pass to the operational amplifier 1026. As shown in FIG. 3, when the compensation value generation circuit 1044 lets the detection voltage VD pass to the operational amplifier 1026, the operational amplifier 1026 can make the second setting voltage SSV be equal to the detection voltage VD to increase the average voltage VA, resulting in the voltage VMD being increased (that is, the drain-source voltage VDS of the power transistor 1022 is increased). Therefore, as shown in FIG. 2, because the drain-source voltage VDS of the power transistor 1022 is increased, the drain-source voltage VDS of the power transistor 1022 is greater than the difference between the gate-source voltage of the power transistor 1022 and the threshold voltage of the power transistor 1022. That is to say, the drain-source voltage VDS of the power transistor 1022 needs to be greater than the difference between the gate-source voltage and the threshold voltage and the gate-source voltage needs to be greater than the threshold voltage to ensure that the power transistor 1022 operates in the saturation region, wherein when the power transistor 1022 operates in the saturation region, the power transistor 1022 can generate the constant current IF.

In addition, when the average voltage VA is less than the predetermined value, the compensation value generation circuit 1044 can generate the compensation value. Therefore, as shown in FIG. 3, when the compensation value generation circuit 1044 generates the compensation value, the compensation value generation circuit 1044 can generate the compensation voltage VC to the operational amplifier 1026 according to the detection voltage VD and the compensation value. Therefore, as shown in FIG. 3, when the compensation value generation circuit 1044 does not generate the compensation value, the compensation value generation circuit 1044 can let the detection voltage VD pass to the operational amplifier 1026. As shown in FIG. 3, when the compensation value generation circuit 1044 generates the compensation voltage VC to the operational amplifier 1026, the operational amplifier 1026 can make the second setting voltage SSV be equal to the compensation voltage VC to increase the average voltage VA, resulting in the voltage VMD being increased (that is, the drain-source voltage VDS of the power transistor 1022 is increased). Therefore, as shown in FIG. 2, because the drain-source voltage VDS of the power transistor 1022 is increased, the drain-source voltage VDS of the power transistor 1022 is greater than the difference between the gate-source voltage of the power transistor 1022 and the threshold voltage of the power transistor 1022. That is to say, the drain-source voltage VDS of the power transistor 1022 needs to be greater than the difference between the gate-source voltage and the threshold voltage and the gate-source voltage needs to be greater than the threshold voltage to ensure that the power transistor 1022 operates in the saturation region.

In addition, operational principles of the constant current generation circuit 102 and the low-pass filter 1042 of the ripple suppressor 300 can be referred to those of the constant current generation circuit 102 and the low-pass filter 1042 of the ripple suppressor 100, so further description thereof is omitted for simplicity.

To sum up, the ripple suppressor can utilize the voltage regulation circuit to determine whether to generate the compensation value according to the average voltage corresponding to a voltage of an end of the light-emitting diode chain, and utilize the voltage regulation circuit to make the constant current generation circuit generate the constant current according to the detection voltage generated by the constant current generation circuit and the compensation value, or make the constant current generation circuit generate the constant current according to the detection voltage. Therefore, compared to the prior art, because the voltage regulation circuit does not generate the compensation value during the high dimming duty cycle of the power factor correction voltage converter, and the voltage regulation circuit generates the compensation value during the low dimming duty cycle of the power factor correction voltage converter, the ripple suppressor not only can save power loss during the high dimming duty cycle of the power factor correction voltage converter, but can also prevent the light-emitting diode chain from generating flickers during the low dimming duty cycle of the power factor correction voltage converter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A ripple suppressor, comprising:
   a constant current generation circuit coupled to a light-emitting diode chain for generating a detection voltage, and generating a constant current to the light-emitting diode chain; and
   a voltage regulation circuit coupled to the light-emitting diode chain and the constant current generation circuit for making the constant current generation circuit generate the constant current according to the detection voltage and a compensation value, or making the constant current generation circuit generate the constant current according to the detection voltage, wherein the compensation value is changed with an average voltage generated by the voltage regulation circuit, and the average voltage corresponds to a voltage of an end of the light-emitting diode chain.

2. The ripple suppressor of claim 1, wherein the constant current generation circuit comprises:
   a power transistor having a drain, a source, and a gate, wherein the drain is coupled to the end of the light-emitting diode chain;
   a current detection resistor coupled between the source and ground, wherein the constant current and the current detection resistor are used for determining the detection voltage, and the constant current corresponds to the voltage of the end of the light-emitting diode chain;
   an operational amplifier, wherein an output terminal of the operational amplifier is coupled to the gate, an output voltage of the output terminal is used for making a gate-source voltage of the power transistor be greater than a threshold voltage of the power transistor and making the power transistor generate the constant current, and the voltage of the end of the light-emitting diode chain coupled to the drain is greater than a difference between the gate-source voltage and the threshold voltage.

3. The ripple suppressor of claim 1, wherein the voltage regulation circuit comprises:
   a low-pass filter coupled to the light-emitting diode chain for filtering ripples of the voltage of the end of the light-emitting diode chain, and generating the average voltage according to the voltage of the end of the light-emitting diode chain;
   a compensation value generation circuit coupled to the constant current generation circuit and the low-pass filter for determining whether to generate the compensation value according to the average voltage, wherein when the compensation value generation circuit generates the compensation value, the compensation value generation circuit generates a compensation voltage further according to the detection voltage and the compensation value, and when the compensation value generation circuit does not generate the compensation value, the compensation value generation circuit lets the detection voltage pass; and a multiplier coupled to the compensation value generation circuit, the constant current generation circuit, and the low-pass filter for generating a first setting voltage according to the compensation voltage or the detection voltage, wherein an operational amplifier comprised in the constant current generation circuit makes the average voltage be equal to the first setting voltage to increase the voltage of the end of the light-emitting diode chain.

4. The ripple suppressor of claim 3, wherein the low-pass filter comprises:
   a gain amplifier having a positive input terminal, a negative input terminal, and an output terminal, wherein the positive input terminal of the gain amplifier is coupled to the end of the light-emitting diode chain, the negative input terminal of the gain amplifier is coupled to a negative input terminal of the operational amplifier and the multiplier, and the output terminal of the gain amplifier is coupled to a positive input terminal of the operational amplifier; and
   a capacitor having a first terminal and a second terminal, wherein the first terminal of the capacitor is coupled to the output terminal of the gain amplifier, and the second terminal of the capacitor is coupled to ground.

5. The ripple suppressor of claim 3, wherein the voltage of the end of the light-emitting diode chain is used for making a power transistor comprised in the constant current generation circuit operate in a saturation region.

6. The ripple suppressor of claim 3, wherein when the average voltage is less than a predetermined value, the compensation value generation circuit generates the compensation value.

7. The ripple suppressor of claim 1, wherein the voltage regulation circuit comprises:
   a low-pass filter coupled to the light-emitting diode chain for filtering ripples of the voltage of the end of the light-emitting diode chain, and generating the average voltage according to the voltage of the end of the light-emitting diode chain;
   a compensation value generation circuit coupled to the constant current generation circuit and the low-pass filter for determining whether to generate the compensation value according to the average voltage, wherein when the compensation value generation circuit generates the compensation value, the compensation value generation circuit generates a compensation voltage to the constant current generation circuit further according to the detection voltage and the compensation value, and when the compensation value generation circuit does not generate the compensation value, the compensation value generation circuit lets the detection voltage pass to the constant current generation circuit; and
   a divider coupled between the low-pass filter and the constant current generation circuit for generating a second setting voltage according to the average voltage, wherein an operational amplifier comprised in the constant current generation circuit makes the second setting voltage be equal to the compensation voltage to increase the voltage of the end of the light-emitting diode chain, or makes the second setting voltage be equal to the detection voltage to increase the voltage of the end of the light-emitting diode chain.

8. The ripple suppressor of claim 7, wherein the low-pass filter comprises:
   a gain amplifier having a positive input terminal, a negative input terminal, and an output terminal, wherein the positive input terminal of the gain amplifier is coupled to the end of the light-emitting diode chain, the negative input terminal of the gain amplifier is coupled to the divider, and the output terminal of the gain amplifier is coupled to the divider; and
   a capacitor having a first terminal and a second terminal, wherein the first terminal of the capacitor is coupled to the output terminal of the gain amplifier, and the second terminal of the capacitor is coupled to ground.

9. The ripple suppressor of claim 7, wherein the voltage of the end of the light-emitting diode chain is used for making a power transistor comprised in the constant current generation circuit operate in a saturation region.

10. The ripple suppressor of claim 7, wherein when the average voltage is less than a predetermined value, the compensation value generation circuit generates the compensation value.

11. The ripple suppressor of claim 1, wherein the light-emitting diode chain comprises light-emitting diode.

* * * * *